US011009515B2

(12) United States Patent
Takahashi et al.

(10) Patent No.: US 11,009,515 B2
(45) Date of Patent: May 18, 2021

(54) AUTOMATIC ANALYZER

(71) Applicant: HITACHI HIGH-TECHNOLOGIES CORPORATION, Tokyo (JP)

(72) Inventors: Takuya Takahashi, Tokyo (JP); Hitoshi Tokieda, Tokyo (JP); Eiichiro Takada, Tokyo (JP); Masashi Fukaya, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 144 days.

(21) Appl. No.: 16/331,583

(22) PCT Filed: Aug. 4, 2017

(86) PCT No.: PCT/JP2017/028359
§ 371 (c)(1),
(2) Date: Mar. 8, 2019

(87) PCT Pub. No.: WO2018/055929
PCT Pub. Date: Mar. 29, 2018

(65) Prior Publication Data
US 2019/0219604 A1    Jul. 18, 2019

(30) Foreign Application Priority Data

Sep. 21, 2016    (JP) .............................. JP2016-183626

(51) Int. Cl.
*G01N 35/00*    (2006.01)
*G01N 35/10*    (2006.01)
*G01N 35/04*    (2006.01)

(52) U.S. Cl.
CPC ....... *G01N 35/00584* (2013.01); *G01N 35/04* (2013.01); *G01N 35/10* (2013.01);
(Continued)

(58) Field of Classification Search
CPC ............ G01N 35/00584; G01N 35/10; G01N 35/1065; G01N 35/04; G01N 35/109;
(Continued)

(56) References Cited

U.S. PATENT DOCUMENTS 4,864,856 A * 9/1989 Ichikawa ............ G01F 23/2966
73/290 V
6,270,726 B1 * 8/2001 Tyberg ............... G01N 35/1011
422/509
(Continued)

FOREIGN PATENT DOCUMENTS

JP    2001183380 A  *  7/2001
JP    2010-175417 A     8/2010
JP    2013-068540 A     4/2013

OTHER PUBLICATIONS

International Search Report of PCT/JP2017/028359 dated Nov. 7, 2017.

*Primary Examiner* — Matthew D Krcha
*Assistant Examiner* — Henry H Nguyen
(74) *Attorney, Agent, or Firm* — Mattingly & Malur, PC

(57) ABSTRACT

An automatic analyzer capable of controlling an interval between the tip of a sample nozzle and the bottom of a reaction container regardless of individual differences between reaction containers and sample nozzles and suppressing adhesion of a sample to the sample nozzle is disclosed. Sample nozzles 13a and 14a are moved toward the bottom surface of a reaction container 2, the movement of the sample nozzles is stopped at a point in time when a stop position detector 46 detects a stop position detection plate 45, the sample nozzles are ascended from the stop position to a position where the stop position detection plate 45 separates from a detection range of the stop position detector 46, and an arm 44 is moved upward by a moving distance stored in a memory.

3 Claims, 13 Drawing Sheets

(52) U.S. Cl.
CPC ....... *G01N 35/109* (2013.01); *G01N 35/1065* (2013.01); *G01N 35/1004* (2013.01); *G01N 2035/00534* (2013.01); *G01N 2035/0406* (2013.01); *G01N 2035/0443* (2013.01); *G01N 2035/0453* (2013.01)

(58) Field of Classification Search
CPC ........... G01N 35/1004; G01N 35/1002; G01N 35/00693; G01N 35/1011; G01N 2035/0406; G01N 2035/0453; G01N 2035/00534; G01N 2035/0443; G01N 2035/1034
See application file for complete search history.

(56) References Cited

U.S. PATENT DOCUMENTS

| | | | |
|---|---|---|---|
| 10,302,668 B2 * | 5/2019 | Yasui | G01N 35/1011 |
| 2012/0196374 A1 * | 8/2012 | Tadashi | G01N 35/02 436/50 |
| 2014/0199779 A1 * | 7/2014 | Yasui | G01N 35/1011 436/180 |

* cited by examiner

[FIG. 1]
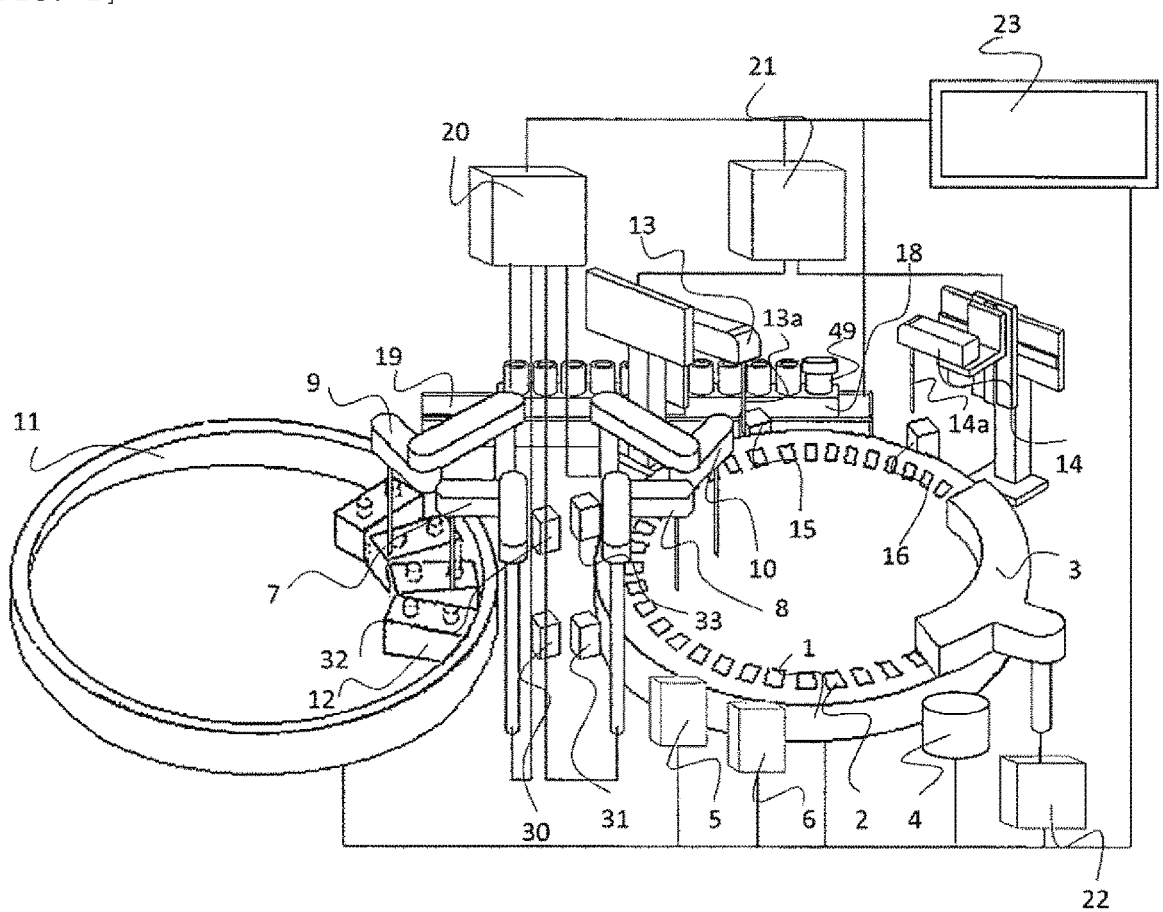

[FIG. 2]
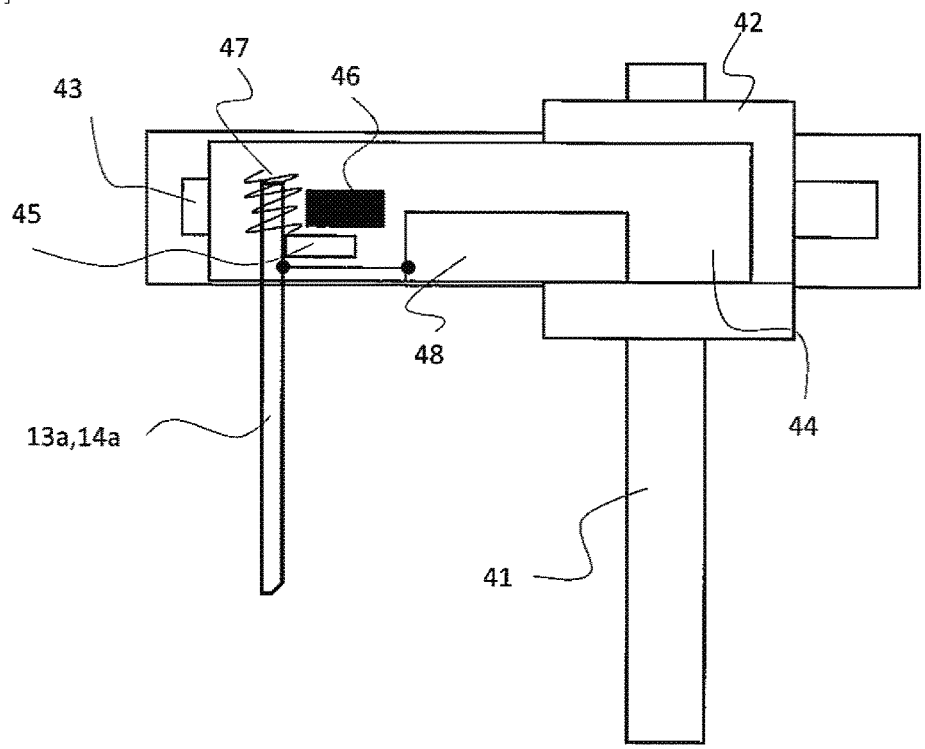
[FIG. 3]
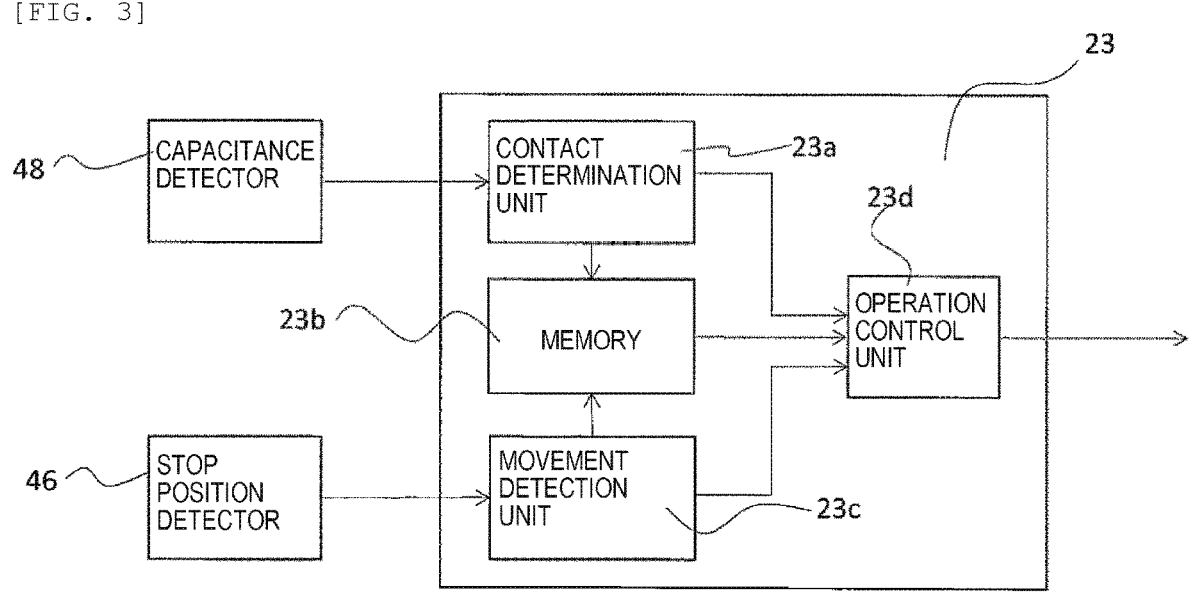

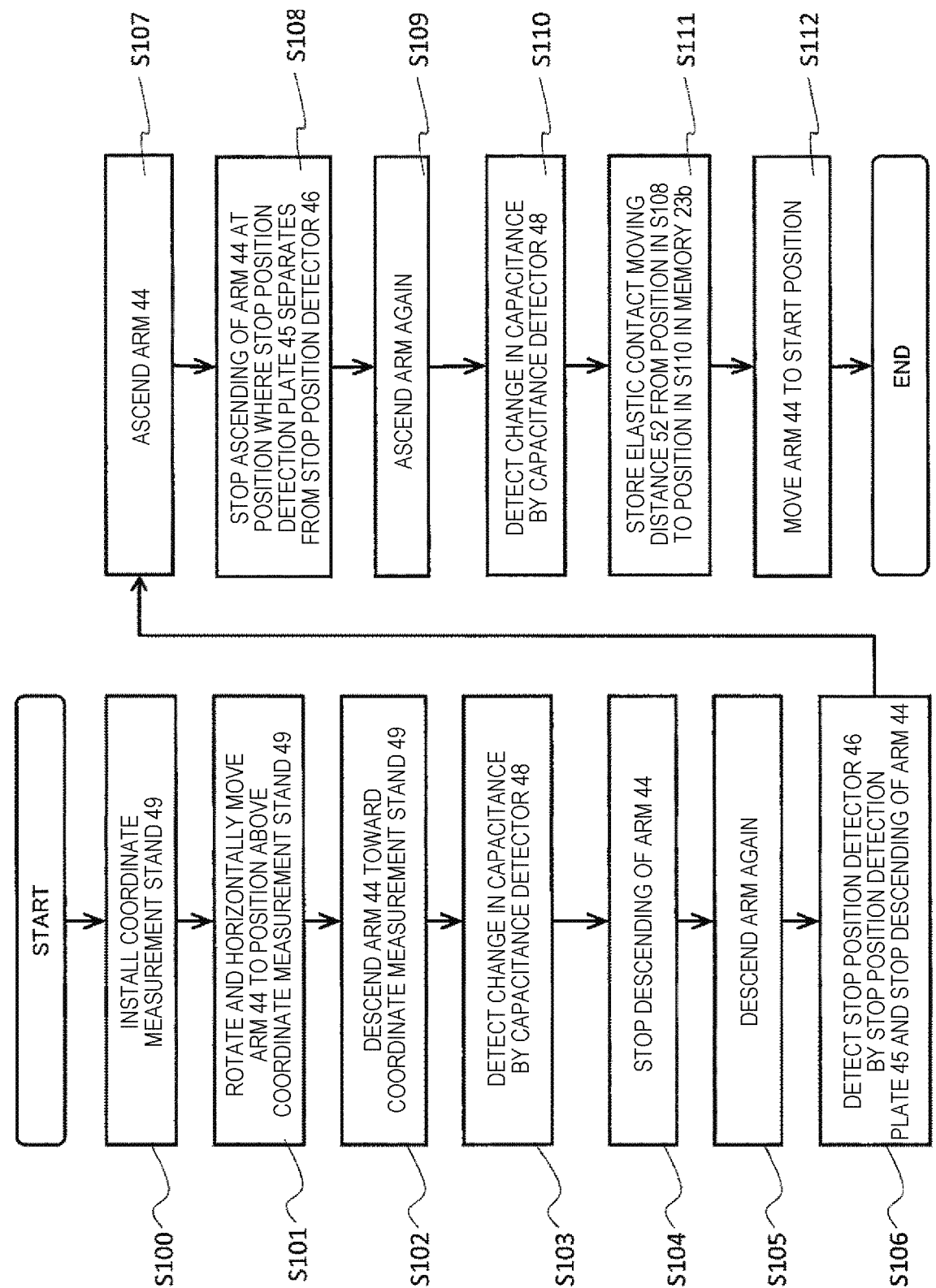
[FIG. 4]

[FIG. 5]
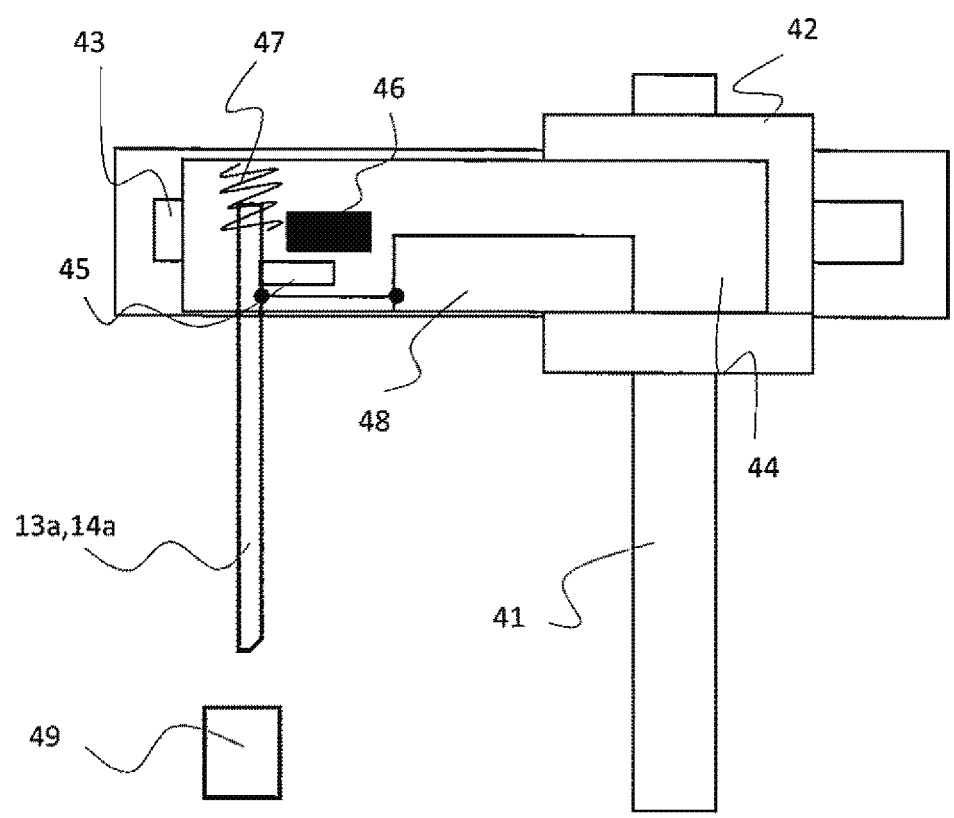

[FIG. 6]
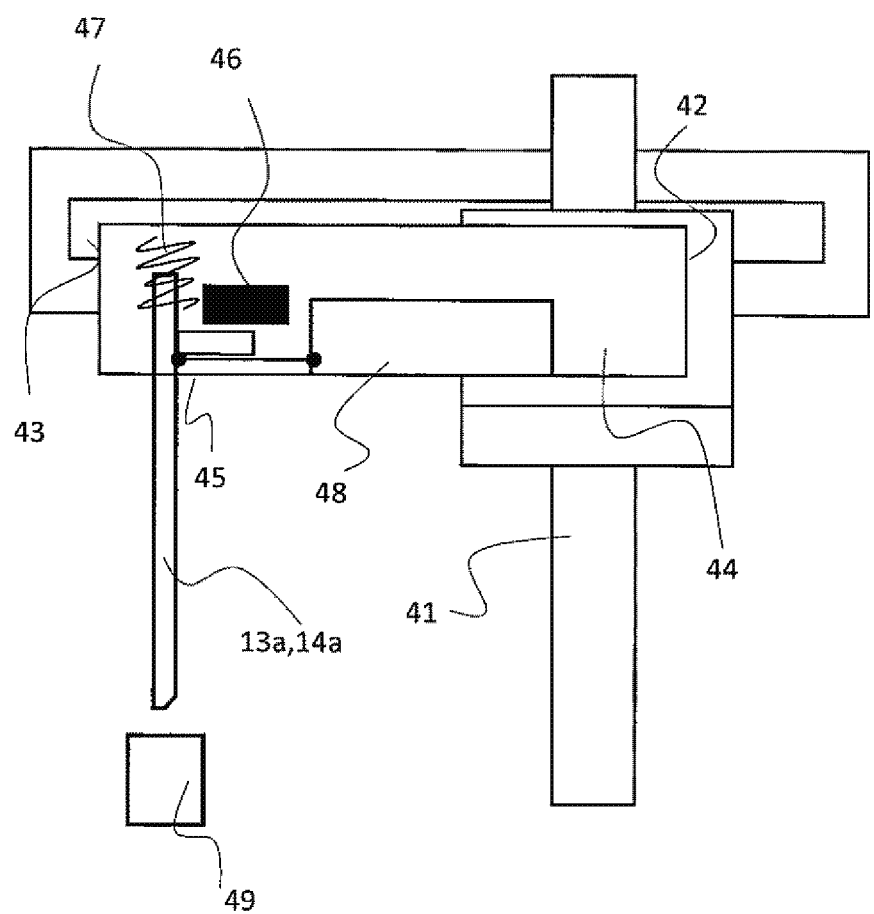

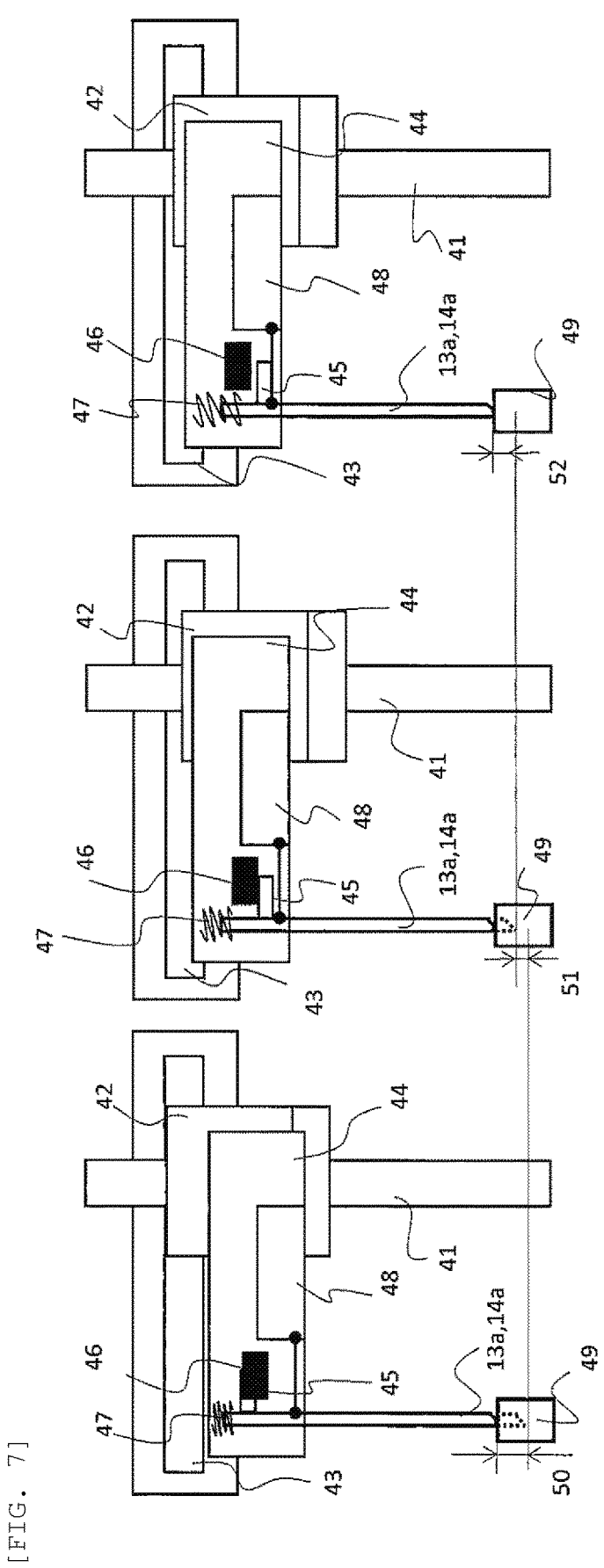
[FIG. 7]

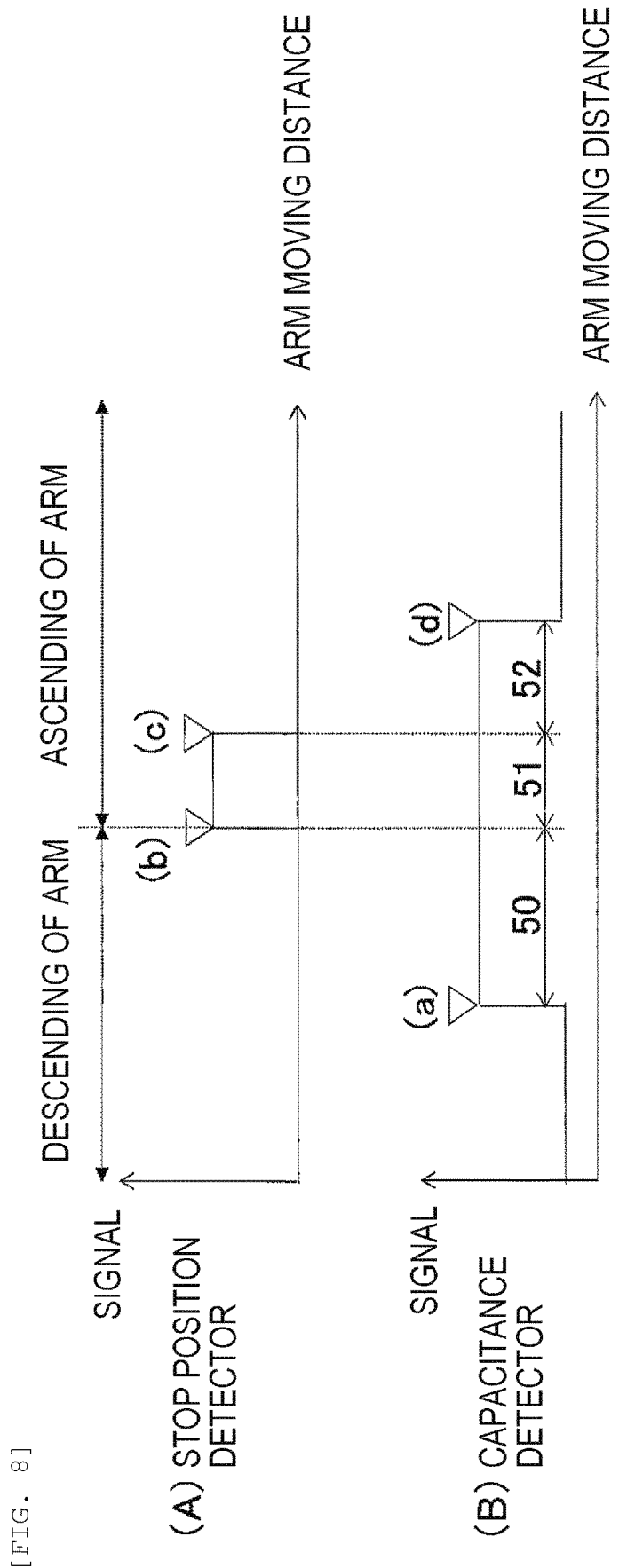
[FIG. 8]

[FIG. 9]
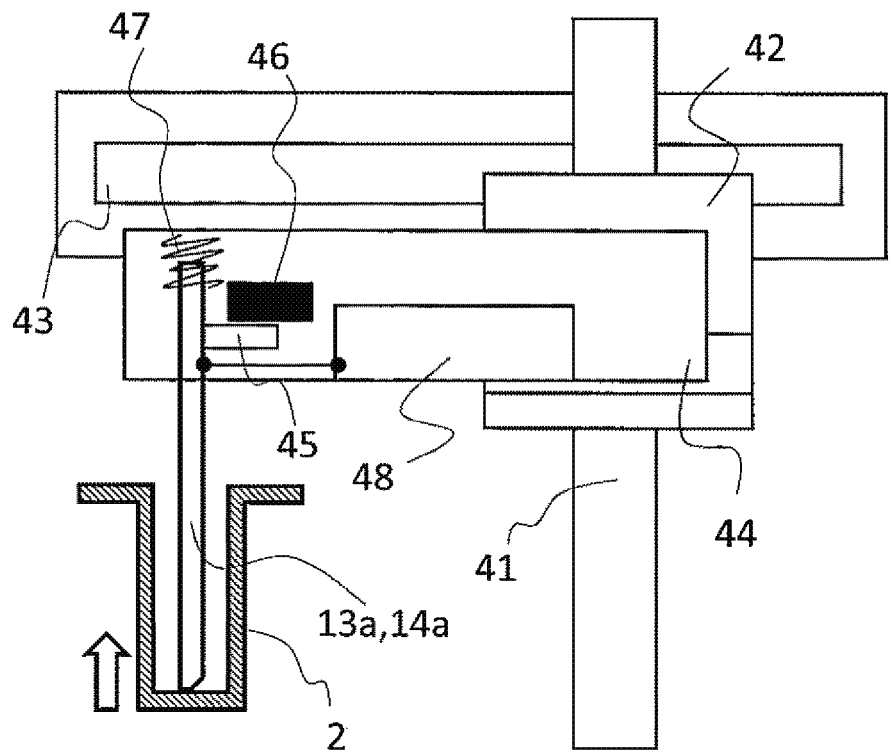
[FIG. 10]
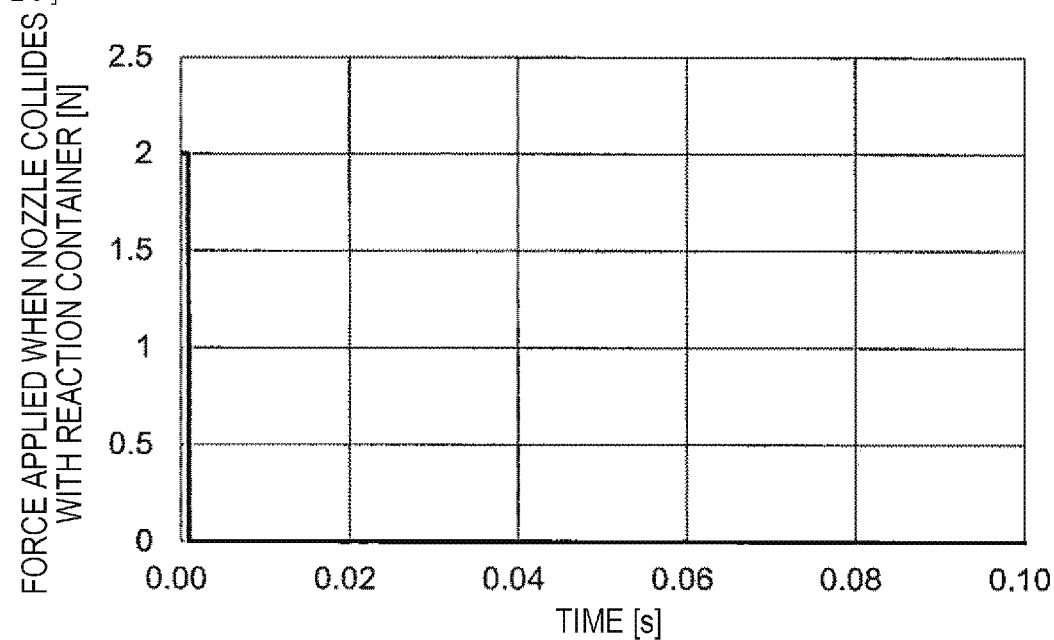

[FIG. 11]
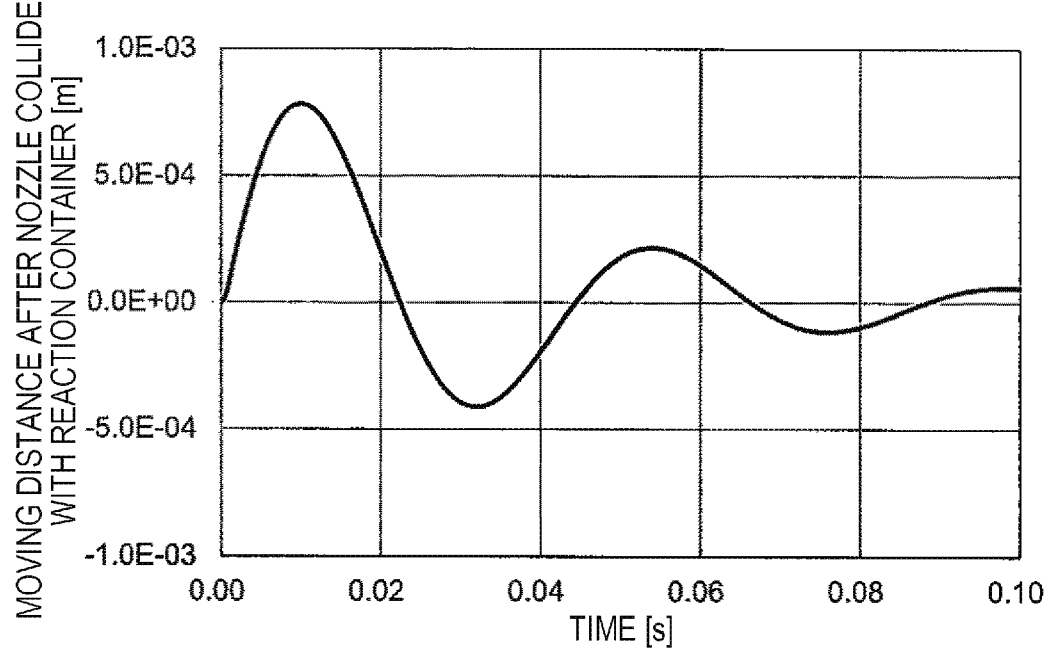

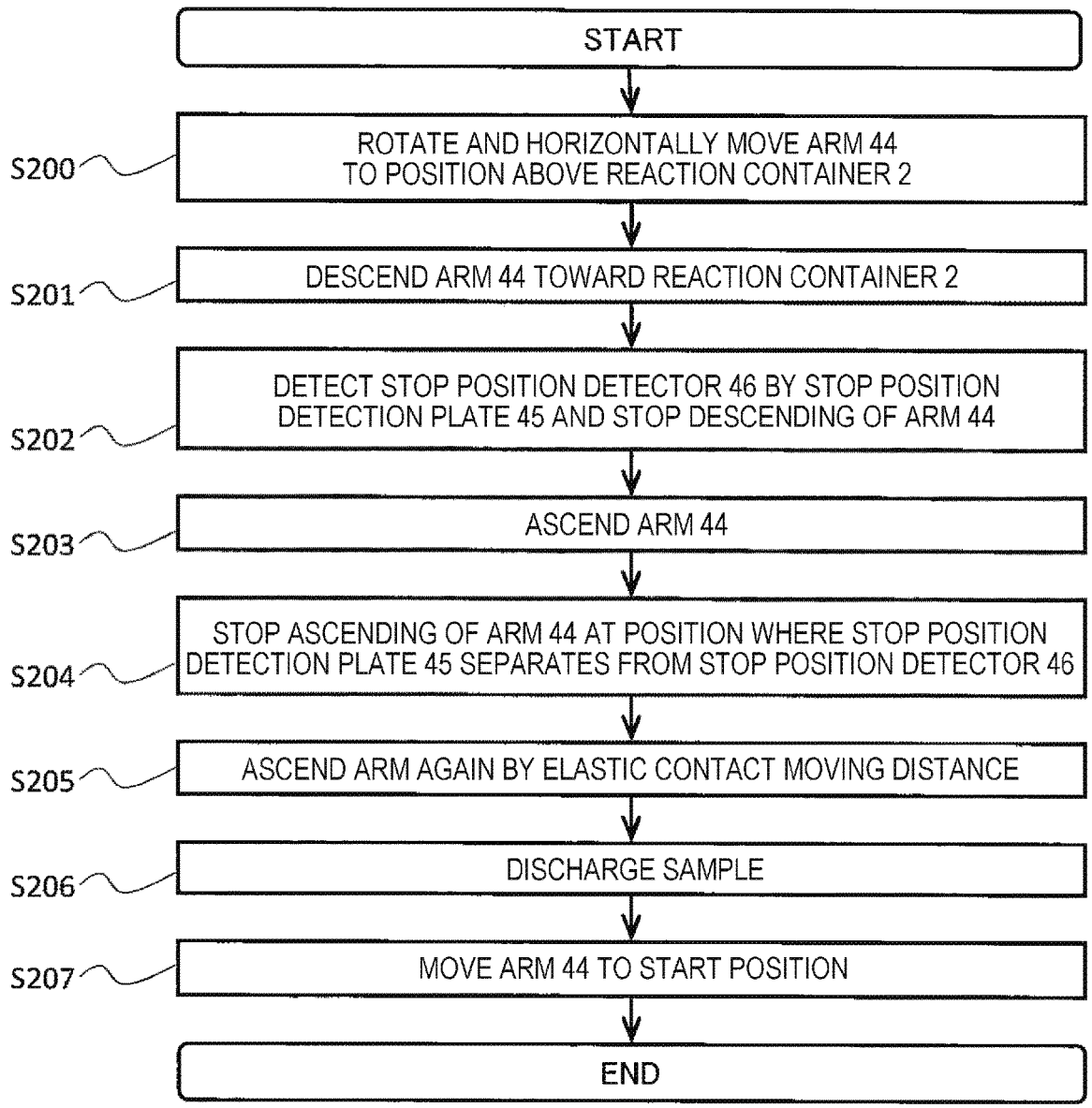
[FIG. 12]

[FIG. 13]
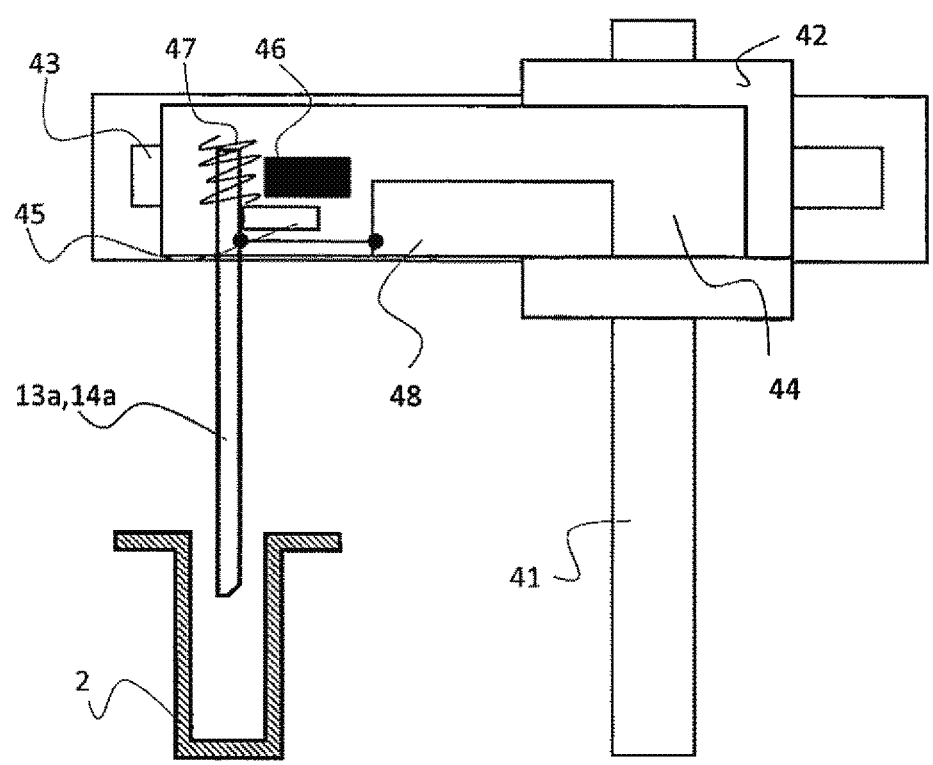

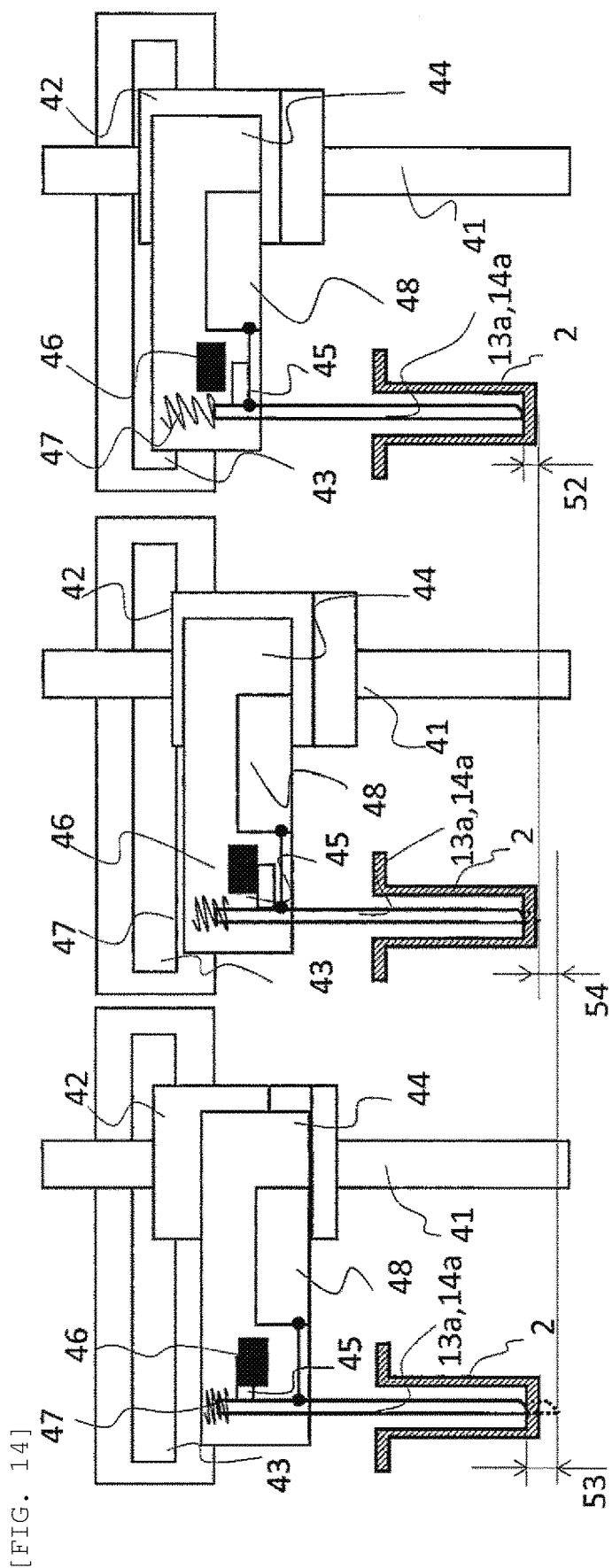
[FIG. 14]

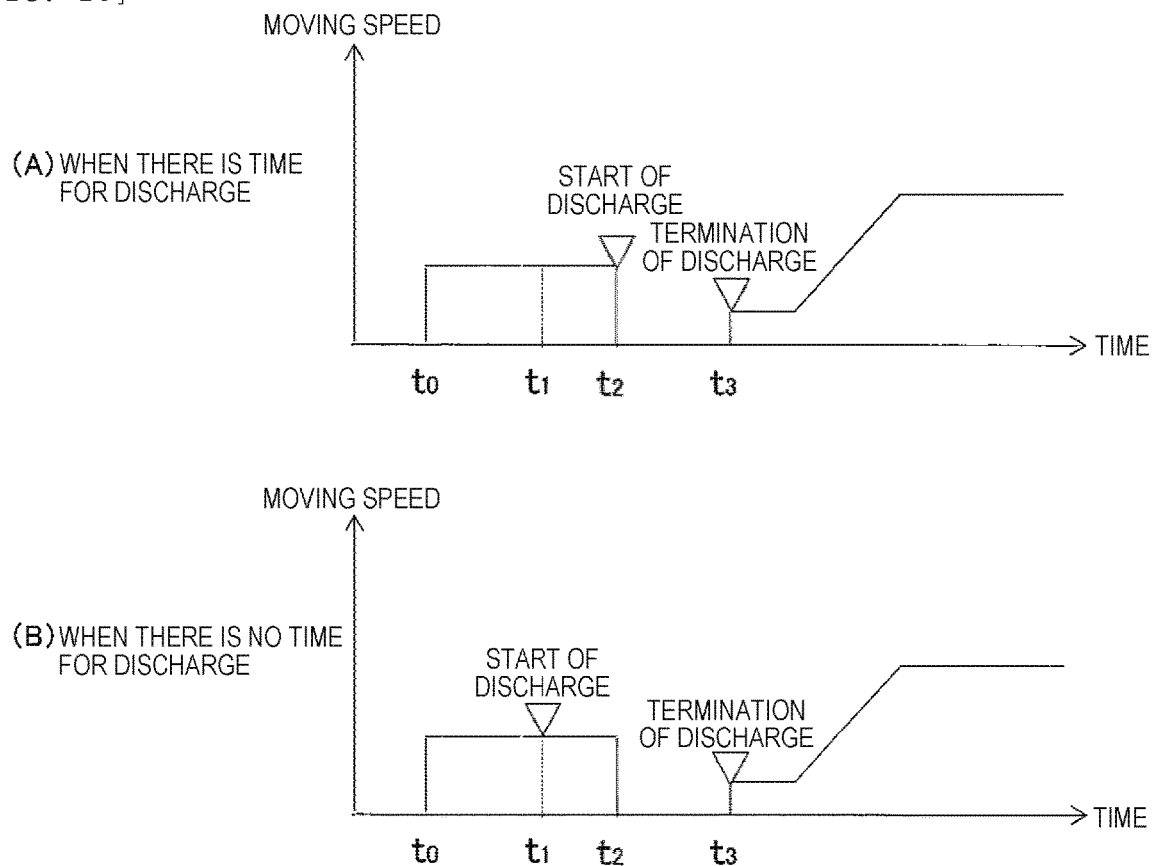

AUTOMATIC ANALYZER

TECHNICAL FIELD

The present invention relates to an automatic analyzer that analyzes biological samples such as blood and urine, and more particularly, to an automatic analyzer including a dispensing mechanism that dispenses predetermined amounts of sample, reagent, and the like.

BACKGROUND ART

Automatic analyzers that perform quantitative or qualitative analysis of a specific component included in a biological sample such as blood or urine have been indispensable for the present diagnosis because of reproducibility of analysis results, a high processing speed, and the like.

A measurement method of an automatic analyzer is broadly classified into an analysis method (colorimetry) using a reagent that reacts with an analysis target component in a sample and changes the color of a reaction solution, and an analysis method (immunoassay) for counting markers using a reagent obtained by adding a marker to a material directly or indirectly and specifically coupled to a target component.

In either of the analysis methods, analysis is performed by mixing a predetermined amount of reagent with a sample. However, in recent years, there have been demands for analyzers capable of reducing the amount of reagent used for analysis in response to requests for reducing analysis costs. A sample to be used for one-time analysis in the present automatic analyzer is an order of one-digit microliter, and it is also required to maintain high dispensing accuracy.

Regarding microscale dispensing of approximately 1 microliter, in a method disclosed in PTL 1, a sample is prevented from adhering to the side surface of a sample nozzle by maintaining a fixed gap between the bottom of a reaction container and the tip of a sample nozzle and ascending the sample nozzle while dispensing the sample when the sample is discharged to the reaction container, thereby improving the accuracy of dispensing.

Further, in a method disclosed in PTL 2, descending of an arm is stopped after a detection plate is inserted into a stop position detector, and a nozzle tip is made to abut against the bottom of a container. Thereafter, the arm ascends by a moving distance stored in a memory in advance, and a sample is discharged to a reaction container.

CITATION LIST

Patent Literature

PTL 1: JP-A-2010-175417
PTL 2: JP-A-2013-068540

SUMMARY OF INVENTION

Technical Problem

In the technique disclosed in PTL 1, a sample is prevented from adhering to the side surface of the sample nozzle by maintaining a fixed gap between the bottom of the reaction container and the tip of the sample nozzle and ascending the sample nozzle while dispensing the sample when the sample is discharged to the reaction container, thereby improving the accuracy of dispensing. In the above-described method, the sample nozzle and the operation of a pump for a sample have to be synchronized with each other, which results in a difficulty in control.

Further, how a sample discharged from the sample nozzle is wetted and spread at the bottom of the reaction container varies depending on a change in wettability with respect to the sample on the bottom of the reaction container due to stains, scratches, or the like or the influence of residual water after cleaning the reaction container. Accordingly, it is extremely difficult to control a distance between the nozzle tip and the bottom of the reaction container and a distance between the liquid level of the discharged sample and the bottom of the reaction container at the same level. In addition, since the sample nozzle performs an ascending operation while discharging a sample, there is a possibility that vibration of the sample nozzle accompanying the ascending operation may affect the accuracy of dispensing.

In the technique disclosed in PTL 2, a moving distance of the arm from when the sample nozzle is brought into contact with a coordinate measurement stand to when the stop position detector detects a stop position detection plate is calculated and stored in the memory. Descending of the arm when dispensing a sample to the reaction container is stopped by the stop position detector detecting the stop position detection plate. Thereafter, the arm ascends by the moving distance stored in the memory to discharge the sample. The purpose of this operation is to stop the sample nozzle on the bottom surface of the reaction container in a state where bending (deflection) of the sample nozzle is suppressed.

However, actual reaction containers individually have different rigidities depending on a fixing method or the like. For example, when the sample nozzle collides with the bottom of a reaction container having high rigidity, the sample nozzle itself jumps up to the top due to an impact of the collision. Since the arm stops descending by the stop position detector detecting the stop position detection plate, the arm in the reaction container having high rigidity is stopped at the higher position than in the reaction container having low rigidity. However, the arm ascends by a moving amount stored in the memory in advance by the above-described method, regardless of the actual stop position of the arm. Accordingly, it is extremely difficult to make bending (deflection) of the sample nozzle uniform when discharging a sample in all of the reaction containers. Particularly, in microscale dispensing, a difference in the magnitude of bending (deflection) of this sample nozzle causes a difference in the amount of sample adhering to the tip of the sample nozzle and the state of discharging of the sample, which may be likely to affect the accuracy of dispensing.

An object of the present invention is to realize an automatic analyzer and a sample dispensing method in the automatic analyzer which are capable of reducing the influence of individual differences between reaction containers and sample nozzles, controlling an interval between the tip of the sample nozzle and the bottom of the reaction container for each sample dispensing, suppressing the adhesion of a sample to the tip of the sample nozzle, and providing a stable discharging state.

Solution to Problem

A representative invention of the present invention is as follows.

There is provided an automatic analyzer including a nozzle that dispenses any one liquid of a sample and a reagent to a reaction container, a dispensing mechanism that includes an arm supporting the nozzle by an elastic member, and a controller that controls vertical movement and horizontal movement of the arm and analyzes a mixed liquid of a sample and a reagent dispensed into the reaction container, in which the nozzle includes a stop position detection plate, the arm includes a stop position detector detecting the stop position detection plate, and the controller includes a memory capable of storing a moving distance of the arm, and the controller stops moving the arm when the stop position detector detects the stop position detection plate during downward movement of the arm, moves the arm by the moving distance stored in the memory in advance and then stops the arm in a subsequent upward movement with a position where the stop position detection plate separates from the stop position detector as a starting point, and performs control such that the liquid is discharged in a state where the arm is stopped.

Advantageous Effects of Invention

According to the present invention, it is possible to discharge a sample so as to be reliably wetted and spread with respect to the bottom of a reaction container, regardless of individual differences between reaction containers and sample nozzles.

BRIEF DESCRIPTION OF DRAWINGS

FIG. 1 is a schematic configuration diagram illustrating an automatic analyzer to which the present invention is applied.

FIG. 2 is a schematic configuration diagram illustrating sample dispensing mechanisms 13 and 14 in an example of the present invention.

FIG. 3 is an internal configuration diagram illustrating a controller 23 in the example of the present invention.

FIG. 4 is a diagram illustrating a method of measuring an elastic contact moving distance 52 in the example of the present invention.

FIG. 5 is a diagram illustrating a method of measuring the elastic contact moving distance 52 in the example of the present invention.

FIG. 6 is a diagram illustrating a method of measuring the elastic contact moving distance 52 in the example of the present invention.

FIG. 7 is a diagram illustrating a method of measuring the elastic contact moving distance 52 in the example of the present invention.

FIG. 8 is a diagram illustrating a relationship between an arm driving distance and an output signal of each of a stop position detector and a capacitance detector.

FIG. 9 is a diagram illustrating a method of discharging a sample to a reaction container 2 in the example of the present invention.

FIG. 10 is a diagram illustrating a force applied when a nozzle collides with a reaction container.

FIG. 11 is a diagram illustrating a moving distance after the nozzle collides with the reaction container.

FIG. 12 is a diagram illustrating a method of discharging a sample to the reaction container 2 in the example of the present invention.

FIG. 13 is a diagram illustrating a method of discharging a sample to the reaction container 2 in the example of the present invention.

FIG. 14 is a diagram illustrating a method of discharging a sample to the reaction container 2 in the example of the present invention.

FIGS. 15A and 15B are diagrams illustrating a method of discharging a sample to the reaction container 2 in the example of the present invention.

DESCRIPTION OF EMBODIMENTS

Hereinafter, an example of the present invention will be described with reference to the accompanying drawings.

Example 1

FIG. 1 is a schematic configuration diagram illustrating an automatic analyzer to which the present invention is applied. In FIG. 1, reaction containers 2 are circumferentially arranged in a reaction disk 1. A plurality of reagent bottles 12 can be disposed on a circumference in a reagent disk 11. A sample transport mechanism 19 moving a rack 18 having a sample container mounted thereon is installed between the reaction disk 1 and the reagent disk 11. Further, reagent dispensing mechanisms 7, 8, 9, and 10 are installed between the reaction disk 1 and the reagent disk 11. In addition, sample dispensing mechanisms 13 and 14 which are rotatable, horizontally movable, and vertically movable are installed between the reaction disk 1 and the sample transport mechanism 19, and the sample dispensing mechanisms 13 and 14 respectively include sample dispensing nozzles (abbreviated to sample nozzles) 13a and 14a. A pump for a sample 21 is connected to the sample nozzles 13a and 14a. The sample nozzles 13a and 14a perform a rotation operation centering on a rotation axis and a horizontal operation of moving on a horizontal movement rail, and perform sample dispensing from the sample container to the reaction container 2.

A cleaning mechanism 3, a spectrophotometer 4, stirring mechanisms 5 and 6, the reagent disk 11, and the sample transport mechanism 19 are disposed in the vicinity of the reaction disk 1, and a cleaning pump 22 is connected to the cleaning mechanism 3. Cleaning tanks 15, 16, 30, 31, 32, and 33 are respectively installed on operation ranges of the reagent dispensing mechanisms 7, 8, 9, and 10, the sample dispensing mechanisms 13 and 14, and the stirring mechanisms 5 and 6. A reagent pump 20 is connected to the reagent dispensing mechanisms 7, 8, 9, and 10.

The sample container accommodating an inspection sample such as blood or urine is mounted on the rack 18 and is carried by the sample transport mechanism 19. In addition, the mechanisms are connected to a controller 23, and the operation of the mechanisms is controlled by the controller 23. In addition, the controller 23 has a function as an analysis unit that analyzes the inspection sample within the reaction container 2. A coordinate measurement stand 49 is installed on the rack 18 and can be transported to a position for coordinate measurement by the sample transport mechanism 19.

FIG. 2 is a schematic configuration diagram illustrating the sample dispensing mechanisms 13 and 14 in an example of the present invention. In FIG. 2, the sample dispensing mechanisms 13 and 14 respectively include the sample nozzles 13a and 14a performing suction and discharge of a sample, an arm 44 holding the sample nozzles 13a and 14a, an elastic body 47 elastically supporting the sample nozzles 13a and 14a, a capacitance detector 48 detecting changes in capacitance of the sample nozzles 13a and 14a, a stop position detection plate 45 connected to the sample nozzles 13a and 14a, a stop position detector 46 installed at the arm 44 detecting the movement of the stop position detection plate 45, a vertical mechanism 41 vertically operating the arm 44, a rotating mechanism 42 rotating the arm 44, and a horizontal mechanism 43 horizontally operating the arm 44. Meanwhile, the stop position detection plate 45 and the stop position detector 46 may serve as both an obstacle detection plate and an obstacle detector or may be provided regardless of each other.

FIG. 3 is an internal configuration diagram illustrating the controller 23 in the example of the present invention. In FIG. 3, the controller 23 includes a contact determination unit 23a that determines that the sample nozzles 13a and 14a have come into contact with a liquid level or an object in accordance with a capacitance detection signal being supplied from the capacitance detector 48 and changing by a fixed value or more, a memory 23b which is capable of storing any moving amount, a movement detection unit 23c to which a stop position detection signal is supplied from the stop position detector 46, and an operation control unit 23d that controls the operation of the sample nozzles 13a and 14a. Meanwhile, the controller 23 also has a function of controlling the operation of other mechanisms such as the reaction disk 1.

Next, a method of measuring an elastic contact moving distance 52 in the example of the present invention will be described with reference to FIGS. 4 to 8.

FIG. 4 illustrates a flow of a method of measuring the elastic contact moving distance 52.

First, the coordinate measurement stand 49 is installed at a predetermined position (S100) (FIG. 5). Next, the arm 44 is moved to a position above the coordinate measurement stand 49 by the rotating mechanism 42 rotating the arm 44 and the horizontal mechanism 43 horizontally operating the arm 44 (S101). The arm 44 and the sample nozzles 13a and 14a descend toward the coordinate measurement stand 49 by the vertical mechanism 41 vertically moving the arm 44 (S102) (FIG. 6).

Next, when the tips of the sample nozzles 13a and 14a come into contact with the coordinate measurement stand 49, the capacitance detector 48 detects a change in capacitance. When the contact determination unit 23a determines the change, the operation control unit 23d stops the descending operations of the arm 44 and the sample nozzles 13a and 14a (S103, S104) ((a) in FIG. 8(B)).

Meanwhile, in order to measure a change in capacitance, the coordinate measurement stand 49 is preferably made of a conductive material, for example, a metal or conductive plastic. The reason why the coordinate measurement stand 49 is made of a conductive material is that a change in capacitance is easily detected when a contact with the coordinate measurement stand occurs. Since it is difficult to determine a contact with the bottom of the reaction container 2 using the capacitance detector 48, it is preferable that the material of the coordinate measurement stand 49 has conductivity higher than that of at least a material used for the reaction container 2. Further, it is preferable that the coordinate measurement stand 49 is connected to ground in order to facilitate detection of a change in capacitance. In addition, the capacitance detector 48 may be replaced with a piezoelectric member. In a case where the piezoelectric member is used, the piezoelectric member is installed in such a manner as to support the sample nozzles 13a and 14a, the displacement of the piezoelectric member caused by the sample nozzles 13a and 14a being pressed against the coordinate measurement stand 49 is converted into a voltage, and the contact determination unit 23a determines the voltage. In this manner, the contact determination unit 23a can not only determine a contact between the sample nozzles 13a and 14a and an object in accordance with a signal from the capacitance detector detecting a change in the capacitance of the nozzles but also determine a contact between the sample nozzles 13a and 14a and an object in accordance with a change in voltage due to deformation of the piezoelectric member supporting the nozzles.

Next, the arm 44 further descends from a state where the tips of the sample nozzles 13a and 14a are in contact with the coordinate measurement stand 49, and the sample nozzles 13a and 14a descend while making an elastic contact, that is, receiving an elastic force of the elastic body 47 (S105). In addition, when the stop position detection plate 45 enters a detection region of the stop position detector 46, a signal of the stop position detector 46 changes as illustrated in (b) of FIG. 8(A), the movement detection unit 23c determines the change, and the operation control unit 23d stops the descending operation of the arm 44 at an arm driving distance a 50 (S106) (the left drawing of FIG. 7). It is conceivable that a sensor such as a photo-interrupter is used as the stop position detector 46.

Next, the arm 44 starts to ascend from a position illustrated in the left drawing of FIG. 7 by the vertical mechanism 41 (S107). In addition, as illustrated in (c) of FIG. 8(A), when the stop position detection plate 45 separates from a detection range of the stop position detector 46, the movement detection unit 23c determines the separation, and the operation control unit 23d stops the ascending operation of the arm 44 at an arm driving distance b 51 (S108) (the middle drawing of FIG. 7).

The arm 44 starts to ascend again from a position illustrated in (c) of FIG. 8(A) by the vertical mechanism 41 (S109). When the tips of the sample nozzles 13a and 14a are separated from the coordinate measurement stand 49, the capacitance detector 48 detects a change in capacitance as illustrated in (d) of FIG. 8(B) (S110) (the right drawing of FIG. 7). A distance from a position where the stop position detection plate 45 separates from the detection region of the stop position detector 46 to a position where the capacitance detector 48 detects a change in capacitance is stored in the memory 23b as the elastic contact moving distance 52 (S111). In other words, the elastic contact moving distance 52 is determined on the basis of a distance from a boundary position where the stop position detector 46 detects the stop position detection plate 45 to a boundary position where the contact determination unit 23a determines a contact between the nozzles and the object, and the moving distance is stored in the memory 23b.

By the above-described measurement method, it is possible to acquire the elastic contact moving distance 52 at which the sample nozzles can be positioned at an elastic contact starting point to be described later, even when there are variations in the dimensions of the sample nozzles 13a and 14a and variations in the distances of the stop position detector 46 and the stop position detection plate 45. The acquisition is performed for each automatic analyzer. In addition, the acquisition is also performed after replacement of the nozzles, and the like are performed.

Finally, the arm 44 is moved to a start position (S112).

Next, movements of the sample nozzles 13a and 14a when the sample nozzles 13a and 14a collide with the reaction container 2 will be described. The reaction containers 2 have different rigidities due to factors such as a method of fixing to the reaction disk 1. FIG. 9 is a schematic view illustrating a moment when the sample nozzles 13a and 14a collide with the reaction container.

FIG. 10 illustrates changes over time in a force applied when the tips of the sample nozzles 13a and 14a collide with the reaction container 2. When the tips of the sample nozzles 13a and 14a collide with the reaction container 2, an upward force is instantaneously applied to the sample nozzles 13a and 14a as illustrated in FIG. 10. Meanwhile, a force to be applied to the instantaneously sample nozzles 13a and 14a becomes stronger as the rigidity of the reaction container 2 increases or a descending speed of the arm 44 increases.

FIG. 11 illustrates movements of the sample nozzles 13a and 14a immediately after collision with the reaction container 2. Since an upward force is instantaneously applied to the sample nozzles 13a and 14a at the time of collision with the reaction container 2 as described above, the sample nozzles move upward immediately after the collision. However, since the sample nozzles 13a and 14a are supported by the elastic body 47, a downward force is immediately applied to push back the sample nozzles 13a and 14a, and the sample nozzles 13a and 14a are eventually stopped while damping vibration.

In the actual operation, the arm 44 also descends toward the reaction container 2. For this reason, a timing at which the stop position detection plate 45 is detected by the stop position detector 46 is determined in accordance with a total speed of a descending speed of the arm 44 toward the reaction container 2 and an upward moving speed immediately after the sample nozzles 13a and 14a collide with the reaction container 2.

Here, since a descending speed of the arm 44 when the arm collides with the reaction container 2 is a fixed speed, a position where the stop position detection plate 45 is detected by the stop position detector 46 is determined in accordance with an upward moving speed immediately after the sample nozzles 13a and 14a collide with the reaction container 2. Accordingly, since a force (and a speed) to be instantaneously applied to the sample nozzles 13a and 14a becomes stronger as the rigidity of the reaction container 2 increases as described above, a position where the stop position detection plate 45 is detected by the stop position detector 46 is located above when seen from the bottom surface of the reaction container 2.

FIGS. 12 to 14 are diagrams illustrating a method of descending the sample nozzles 13a and 14a to the reaction container 2 in the example of the present invention. The sample nozzles 13a and 14a collecting a sample from the sample container are moved to a position above the reaction container 2 by the rotating mechanism 42 rotating the arm 44 and the horizontal mechanism 43 horizontally operating the arm 44 and then descend toward the bottom of the reaction container 2 (S200, S201) (FIG. 13).

Since a solution within the reaction container 2 is measured by the spectrophotometer 4, glass or plastic having a high transmittance is mainly used as the material of the reaction container, and it is difficult to determine a contact between the sample nozzles 13a and 14a and the bottom of the reaction container 2 by the capacitance detector 48.

Consequently, after the sample nozzles 13a and 14a come into contact with the bottom of the reaction container 2 and then make an elastic contact, the arm 44 descends and is then stopped at a position where the stop position detector 46 detects a stop position detection plate 45 (S202) (the left drawing of FIG. 14). An arm moving distance c from a position at the moment when the sample nozzles 13a and 14a come into contact with the bottom of the reaction container 2 to a position where the sample nozzles are stopped is denoted by 53.

Next, an arm mechanism is ascended by an arm moving distance d 54 until the stop position detection plate 45 separates from a detection range of the stop position detector 46 (S203, S204) (the middle drawing of FIG. 14). In this case, it is assumed that an ascending distance to be input to a motor is sufficiently larger than the above-described arm driving distance b 51. By adopting this method, it is possible to operate the arm to a position where the stop position detector 46 cancels detection from the stop position detection plate 45, regardless of a difference in a stop position of the arm which is caused by a difference in rigidity between the reaction containers 2.

Next, the arm 44 is ascended by the elastic contact moving distance 52 described above to move the sample nozzles 13a and 14a to the elastic contact starting point with the bottom surface of the sample container 2 (S205) (the right drawing of FIG. 14). The sample is discharged (S206). In addition, the arm 44 is moved to a start position (S207).

By adopting the above-described method, it is possible to perform operation control so that the tips of the sample nozzles 13a and 14a are positioned at the elastic contact starting point with the bottom surface of the sample container 2, regardless of variations in the sample nozzles 13a and 14a installed in the automatic analyzer, variations in the dimensions of the reaction container 2, and a difference in rigidity. Thereby, it is possible to discharge a sample so as to be reliably wetted and spread with respect to the bottom of the reaction container, regardless of individual differences between the reaction containers and the sample nozzles.

In addition, since the bottom surface of the reaction container 2 and the sample nozzles 13a and 14a are in a contact state even when the bending of the sample nozzles 13a and 14a is opened due to the movement of the sample nozzles 13a and 14a to the elastic contact starting point, the sample nozzles 13a and 14a do not vibrate.

Example 2

FIGS. 15A and 15B are diagrams illustrating a method of discharging a sample to the reaction container 2 in the example of the present invention. After the arm stops descending toward the reaction container 2, it is possible to change a discharging operation start time in accordance with a dispensing amount or time required for dispensing. When there is a sufficient operation time for the sample nozzles 13a and 14a to discharge a sample, the sample nozzles 13a and 14a are moved upward from time $t_0$ to time $t_2$, illustrated in FIG. 15(A), at which the upward movement of the sample nozzles to the elastic contact starting point is terminated as illustrated in FIG. 15(A). Next, the sample nozzles 13a and 14a start to discharge a sample from time $t_2$ at which the upward movement is terminated. In addition, the discharge of the sample is completed until time $t_3$, and the arm 44 is moved upward to an upper limit point.

On the other hand, when there is no time to perform a discharging operation, the sample nozzles 13a and 14a are moved upward from time $t_0$ to time $t_1$, illustrated in FIG. 15(B), during which the stop position detection plate 45 separates from a detection range of the stop position detector 46 as illustrated in FIG. 15(B). Next, the sample nozzles 13a and 14a start to discharge a sample from time $t_1$ at which the upward movement is terminated. Thereafter, the discharge of the sample is completed until time $t_3$, and the arm 44 is moved upward to an upper limit point. A state where the bending of the sample nozzles 13a and 14a has not yet been suppressed (a state where the sample nozzles are supported by the elastic body) is established at a position where the stop position detection plate 45 separates from the detection range of the stop position detector 46 at time $t_1$. However, the position where the stop position detection plate 45 separates from the detection range of the stop position detector 46 is fixed regardless of a difference in rigidity between the reaction containers 2, and thus it is possible to perform sample discharge with high reproducibility even when the sample discharge is started from time $t_1$ illustrated in FIG. 15(B).

In this manner, the sample discharge may be started after the sample nozzles are ascended to the elastic contact starting point and are then stopped, or may be started from a position where the stop position detection plate separates from the stop position detector. In the latter case, it is possible to reduce time to discharge a sample or reduce time until the discharge is completed, as compared to the former case. Meanwhile, in the latter case, the sample discharge may be started before the sample nozzles are ascended to the elastic contact starting point and are then stopped.

In addition, the controller 23 may determine which of either the control in the former case or the control in the latter case is performed, on the basis of a discharging amount of the sample or a discharging speed of the sample. That is, it is preferable that the control in the former case is applied in a case where a discharging amount of the sample is relatively large or larger than a predetermined amount and the control in the latter case is applied in a case where a discharging speed of the sample is relatively low even when discharging amounts are the same or a discharging speed of the sample is lower than a predetermined speed.

Meanwhile, in FIG. 8, descending of the arm is stopped at the same time when the stop position detector detects a stop detection plate. However, actually, the arm is stopped after advancing from a position where the stop position detector starts to detect the stop detection plate. This additional advance distance is set to be a sufficient distance so that the stop position detector can reliably detect the stop detection plate when the sample nozzles are stopped even when there are variations in stop positions of the sample nozzles due to a difference (variation) in the rigidity of the bottom between the reaction containers. In addition, when the arm is ascended, setting for ascending the arm by a predetermined distance may be performed to separate the stop position detection plate from the stop position detector. In this case, a distance at which the stop position detection plate reliably separates from the stop position detector even when there are variations in the above-described stop position is determined, and the arm is ascended by the distance. It is possible to reliably detect that the stop position detection plate has separated from the stop position detector before movement at this distance is terminated with respect to all of the reaction containers in order to ascend the arm at a distance for reliable separation. Further, in order to ascend the arm by the same elastic contact moving distance with respect to all of the reaction containers with a position where the stop position detection plate reliably separates from the stop position detector as a starting point, it is possible to substantially eliminate an influence due to the above-described difference (variation) in the rigidity of the bottom between the reaction containers and to make bending (deflection) at the time of sample discharge of the sample nozzles uniform in all of the reaction containers, regardless of individual differences between the reaction containers and the sample nozzles.

In the example, discharge of a sample has been described as an example, but the invention can also be applied to discharge of a reagent and may be applied to a reagent dispensing mechanism.

REFERENCE SIGNS LIST

1: reaction disk
2: reaction container
3: cleaning mechanism
4: spectrophotometer
5, 6: stirring mechanism
7, 8, 9, 10: reagent dispensing mechanism
11: reagent disk
12: reagent bottle
13, 14: sample dispensing mechanism
13*a*, 14*a*: sample nozzle
15, 16: cleaning tank
18: rack
19: sample transport mechanism
20: reagent pump
21: pump for a sample
22: cleaning pump
23: controller
23*a*: contact determination unit
23*b*: memory
23*c*: movement detection unit
23*d*: operation control unit
30, 31, 32, 33: cleaning tank
41: vertical mechanism
42: rotating mechanism
43: horizontal mechanism
44: arm
45: stop position detection plate
46: stop position detector
47: elastic body
48: capacitance detector
49: coordinate measurement stand
50: arm driving distance a
51: arm driving distance b
52: elastic contact moving distance
53: arm driving distance c
54: arm driving distance d

The invention claimed is:

1. An automatic analyzer comprising:
a spectrophotometer configured to measure a mixed liquid of a sample and a reagent
a nozzle configured to dispense any one liquid of the sample and the reagent to a reaction container;
a dispensing mechanism that includes an arm supporting the nozzle by an elastic member; and
a controller configured to control vertical movement and horizontal movement of the arm and analyze the mixed liquid of the sample and the reagent dispensed into the reaction container, wherein
the nozzle includes a stop position detection plate, the arm includes a stop position detector configured to detect the stop position detection plate, and the controller includes a memory which stores a moving distance of the arm,
the controller is configured to stop moving the arm when the stop position detector detects the stop position detection plate during downward movement of the arm, move the arm in a subsequent upward movement to a first position where the stop position detection plate separates from the stop position detector, move the arm by the moving distance from the first position to a second position, and perform control such that the liquid is discharged in a state where the arm is stopped, and
the controller is configured to determine the moving distance stored in the memory based on a distance between a first boundary position where the stop position detector detects the stop position detection plate and a second boundary position where the controller determines a contact between the nozzle and an object during an upward movement of the nozzle from the first boundary position to the second boundary position.

2. The automatic analyzer according to claim 1, wherein the controller is configured to determine the contact between the nozzle and the object in accordance with a signal received from a capacitance detector that detects a change in capacitance of the nozzle.

3. The automatic analyzer according to claim 1, wherein the controller is configured to perform first control for starting discharging the liquid in a state where the arm is moved upward to the first position where the stop position detection plate separates from the stop position detector, and second control for starting discharging the liquid in a state where the arm is moved upward by the moving distance and is then stopped at the second position, and the controller is configured to perform either the first control or the second control on the basis of a discharging amount of the liquid or a discharging speed of the liquid.

\* \* \* \* \*